US006173899B1

(12) United States Patent
Rozin

(10) Patent No.: US 6,173,899 B1
(45) Date of Patent: Jan. 16, 2001

(54) METHOD AND SYSTEM FOR CONTACTLESS ENERGY TRANSMISSION AND DATA EXCHANGE BETWEEN A TERMINAL AND IC CARD

(76) Inventor: Alexander Rozin, P.O. Box 11043, Jerusalem (IL), 91110

( * ) Notice: Under 35 U.S.C. 154(b), the term of this patent shall be extended for 0 days.

(21) Appl. No.: 09/054,543

(22) Filed: Apr. 3, 1998

(51) Int. Cl.[7] .................................................. G06K 19/06
(52) U.S. Cl. .......................... 235/492; 235/451; 235/449
(58) Field of Search .................................. 235/492, 449, 235/451, 382; 902/26

(56) References Cited

U.S. PATENT DOCUMENTS

| | | | |
|---|---|---|---|
| 4,480,178 | * 10/1984 | Miller, II et al. | 235/380 |
| 4,795,898 | * 1/1989 | Bernstein et al. | 235/487 |
| 5,013,898 | * 5/1991 | Glasspool | 235/449 |
| 5,191,192 | * 3/1993 | Takahira et al. | 235/375 |
| 5,428,659 | * 6/1995 | Renner et al. | 378/162 |
| 5,444,222 | * 8/1995 | Inoue | 235/380 |
| 5,631,611 | * 5/1997 | Luu | 333/17.3 |
| 5,847,447 | * 12/1998 | Rozin et al. | 235/451 X |

* cited by examiner

Primary Examiner—Donald Hajec
Assistant Examiner—Diane I. Lee

(57) ABSTRACT

The present invention relates to methods and systems for power and energy transfer for non-contact IC cards, which is capable to communicate with an external device such as a host terminal. The disclosed method and system give the possibility to combine inductive coupling for remote power and data transmission, and capacitive coupling while IC card is attached to terminal, in order to transfer a large amount of energy. The new in the art is that bidirectional data and energy transfer from a terminal into an IC card is performing at two different carrier frequencies of an energy-transmitting alternating field. Herein the remote data transmission and energy transfer into the IC card is provided at first, lowest, frequency, utilizing the inductive coupling between a terminal transmitting-receiving coil and a IC card transmitting-receiving coil. Additionally, the close contactless energy and data transmission into the IC card is provided at second, higher, frequency utilizing the capacitive coupling between a terminal and IC card capacitive pads while IC card is attached to the terminal. The first frequency is designed to be a frequency of a parallel resonance combined by parallel alignment of an IC card inductive coil and a distributed capacitance of an IC card capacitive pads. The second frequency is designed to be a frequency of a series resonant circuit associated with series alignment of additional terminal inductance and joint capacitance of a terminal capacitive pads and IC card capacitive pads, when card is attached to terminal.

7 Claims, 4 Drawing Sheets

METHOD AND SYSTEM FOR CONTACTLESS ENERGY TRANSMISSION AND DATA EXCHANGE BETWEEN A TERMINAL AND IC CARD.

File: contactlss fig4-5.ppt

METHOD AND SYSTEM FOR CONTACTLESS ENERGY TRANSMISSION
AND DATA EXCHANGE BETWEEN A TERMINAL AND IC CARD.

File: contactlss.ppt

METHOD AND SYSTEM FOR CONTACTLESS ENERGY TRANSMISSION AND DATA EXCHANGE BETWEEN A TERMINAL AND IC CARD

FIELD OF THE INVENTION

The present invention relates to systems and methods for non-contact power and energy transfer, using electromagnetic alternating field, for IC card which is capable to communicate with an external device such as a terminal, card reader/writer and etc., in remote mode at a distance and in proximity mode while IC card is attached to terminal.

BACKGROUND OF THE INVENTION

Systems for noncontact exchange of data are known in different designs and types. Inductively operating systems comprising radio frequency tags and reader/writer terminal and performing low frequency range that allows operating at relatively long distances, are well known in the art. Herein tags and cards employ using transmitting and receiving coils arranged in the terminal and in the card.

Several designs use electromagnetic coupling schemes including transmitting and receiving coils in the terminal and in the card. Other card designs utilize a capacitive interface between the card and terminal to transfer power. Capacitor plates are positioned on a surface of the card and corresponding plates are positioned in the terminal. When the card and terminal bring into contact, each pair of corresponding plates form a capacitor over which power may be transferred.

One example of the remotely operating cards, having electromagnetic coupling, is disclosed in U.S. Pat. No. 5,444,222 Inoue et.al., 1995 (Non-contact IC card, terminal for use with the non-contact IC card and non-contact IC card system having the non-contact IC card and the terminal, assignee Mitsubishi Denki Kabushiki Kaisha). Herein a non-contact IC card, a non-contact IC card terminal and a non-contact IC card system for performing data communication between the IC card and the terminal by using electromagnetic waves are arranged so that the IC card can reliably receive data transmitted from the terminal once the IC card is started up by a startup signal from the terminal. However the disclosed embodiment has an on-card battery to power microprocessor which controls data processing since the amount of a transferred electric power is not enough to energize on-card electronic circuit.

Next embodiment disclosed in U.S. Pat. No. 4,480,178 Miller, II et. al, 1984 describes a circuit for maximizing power transfer from a station to an interactive memory card via a capacitive interface. A reader system in the station generates an AC signal which provides operating power that is transferred to the card through the capacitive interface formed when the card is placed against a window on the station. The AC signal from the station is directed through a series resonant circuit to the card. The capacitive interface between the station and card make up the capacitive element of the resonance circuit while the series combination of the secondary of a transformer and an electrically variable inductor form the inductive element. Use of the variable inductor allows the station to tune the circuit to resonance and cancel the capacitive element, thereby maintaining maximum power transfer to the card.

An example of embodiment, utilizing a pure capacitive coupling to transfer power and data, is disclosed in U.S. patent application Ser. No. 08/677,412 Rozin et.al., Filed: Jul. 9, 1996, (the Israel patent application No.117,944 Filed on May 17, 1996) where the capacitive coupled bi-directional data and power transfer system is described, which includes a portable device with a first contact circuit formed from a pair of contact pads having an outer surface covered with a dielectric material. A processing unit is coupled to the first contact circuit. A host unit has a second contact circuit including a second pair of contact pads, which are also covered with a dielectric material. A host-processing unit is coupled to the second contact circuit. The first and second contact circuits are adapted to form a capacitive interface when the portable device is positioned proximate the host unit. The capacitive interface transmits both power and bidirectional data signals from the host unit to the portable device. And the same contacts are used to transmit bidirectional data signals between the portable device and the host unit.

However the disclosed designs can not operate at a distance more than few microns, i.e. in this system a card must be pressed by a receptacle part of terminal transducer when a card is inserted into slot of reader/writer. That guides to a huge restriction in a number of applications, for example in applications, which require the remote operation and short transaction time at once, such as mass transit and access systems, like underground, buses, railways and so on.

Embodiment disclosed in U.S. Pat. No. 5,594,233 Kenneth et.al., 1997 (Multiple standard smart card reader, assignee AT&T Global Information Solutions Company, Dayton, Ohio) comprising a card reader having a single entry slot for cards, and an electronic control means for controlling the operation of the reader. The reader further includes a smart card reading section incorporating a plurality of terminals respectively adapted to read contact smart cards, inductive contactless smart cards and capacitive contactless smart cards. A pair of endless belts is arranged to form a feed path there between. A card inserted through the entry slot is received between the endless belts and transported through the card reader and positioned in the smart card reading section so that smart card terminals on the card are located beneath corresponding smart card in the card reader. Data can then be read from the card if the card is a contact smart card, an inductive contactless smart card or a capacitive contactless smart card.

However, the disclosed embodiment is intended to operate in a mode where card is inserted into slot of reader/writer and do not permit operation at a distance between reader/writer device and a card.

The embodiment disclosed in U.S. Pat. No. 4,795,898, Bernstein et.al., 1989, (Personal memory card having a contactless interface using differential data transfer, Bernstein et.al., 1989, AT&T Bell Laboratories, AT&T Information Systems Inc.), describes a portable data card including memory means for storing data and processor means for processing data, energy coupling means for receiving magnetic energy transmitted from the reader/writer station and for converting the magnetic energy into electric energy for energizing the memory means and the processor means; and the capacitive coupling means and the energy coupling means providing in combination a complete communication interface between the data card and the reader/writer station.

However, the disclosed embodiment operates in a mode where card is inserted into slot of reader/writer and do not permit operation at a distance between reader/writer device and a card. In addition this embodiment requires a careful alignment of card and reader/writer receptacle transducer.

The purpose of the present invention is to provide a reliable method and device for reliable, stable and convenience operation of a smart card in contactless manner in inserted mode when significantly large electric energy may be transferred to power on-card smart electronics having a big mass storage, and in remote mode at a distance to provide a short time transactions when the same contactless card is used for access and mass transit applications.

SUMMARY OF INVENTION

The purpose is achieved by using in a method for contactless bidirectional data and energy transfer from a terminal into an IC card the generation of two different frequencies of carrier of an energy-transmitting alternating field, which frequencies are modulated with data signal. Herein the remote contactless bidirectional data transmission and energy transfer into the IC card is provided at first, lowest, frequency, utilizing the inductive coupling between a terminal transmitting-receiving coil and a IC card transmitting-receiving coil. Additionally, the close contactless energy and data transmission into the IC card is provided at second, higher, frequency utilizing the capacitive coupling between a terminal and IC card capacitive means while IC card is attached to the terminal.

Said first frequency is designed to be a frequency of a parallel resonance combined by parallel alignment of a IC card inductive coil and a distributed capacitance of a IC card capacitive means.

Said second frequency is designed to be a frequency of a series resonant circuit associated with joint capacitance of a terminal capacitive means and IC card capacitive means, when card is attached to terminal, and additional inductance of a terminal, and moreover, a second frequency is selected to be as higher than first frequency as at which an equivalent impedance of a said IC card inductive coil is significantly large to load the series resonant circuit combined by serial alignment of a said terminal and IC card capacitive means and an additional inductance of terminal.

DESCRIPTION OF THE PREFERRED EMBODIMENTS

Figure 1:
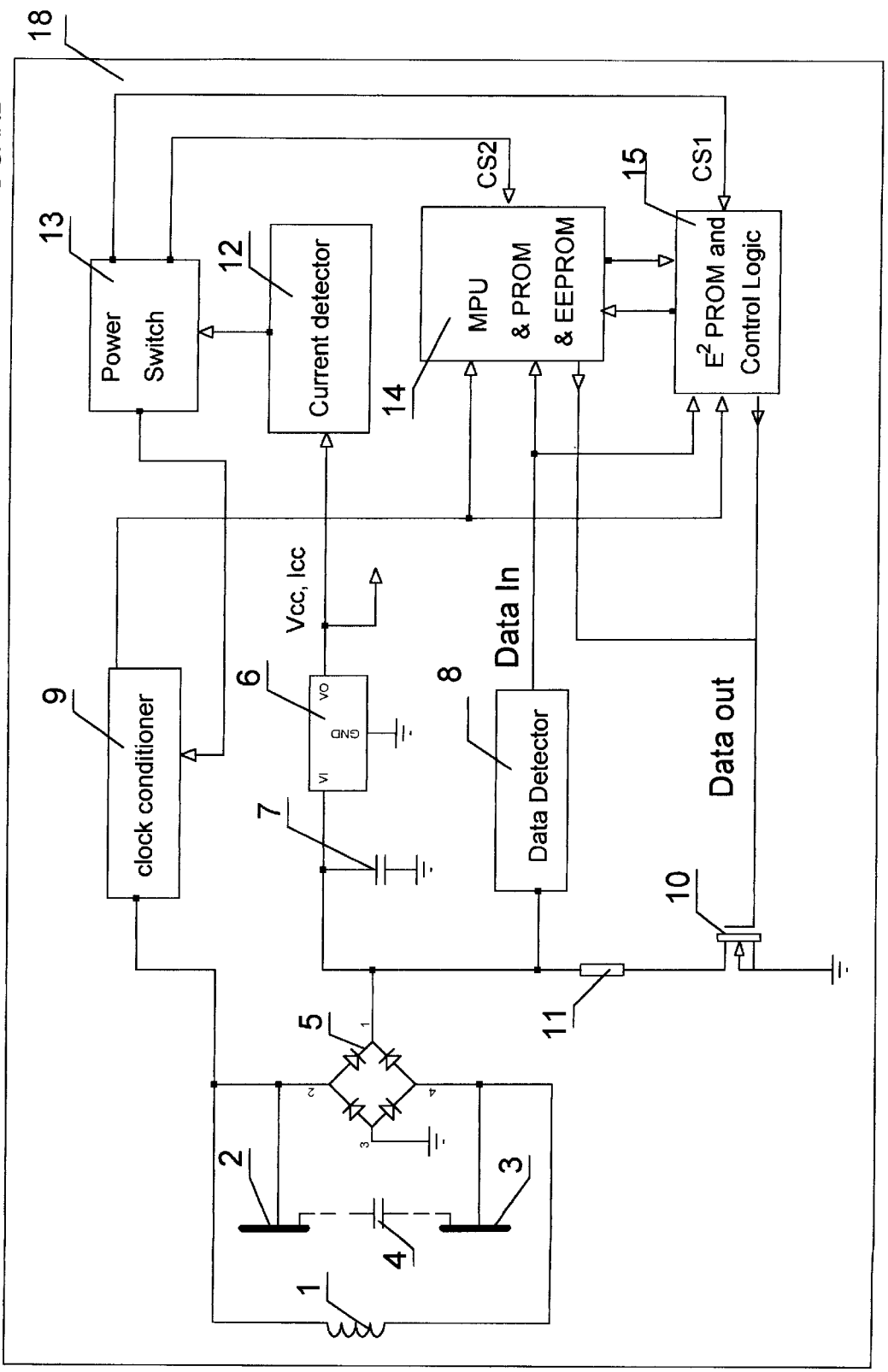
FIG. 1 is an electric block diagram of one implementation of a noncontact IC card according the disclosed method of contactless energy and data transmission.

FIG. 1 illustrates a block diagram of a noncontact IC card according present invention, comprising inductive coil 1, capacitive pads 2 and 3, distributed capacitance 4, diode bridge 5, voltage regulator 6, smoothing capacitor 7, data detector 8, clock conditioner 9, modulating transistor 10 connected through loading resistor 11 to the output of diode bridge 5, current detector 12, power switch 13, microprocessor (MPU) 14 including internal mask ROM and flash EEPROM (not shown separately), $E^2$PROM 15 comprising control logic (not shown as separate circuit) to provide a proper operation of $E^2$PROM 15.

Figure 2:
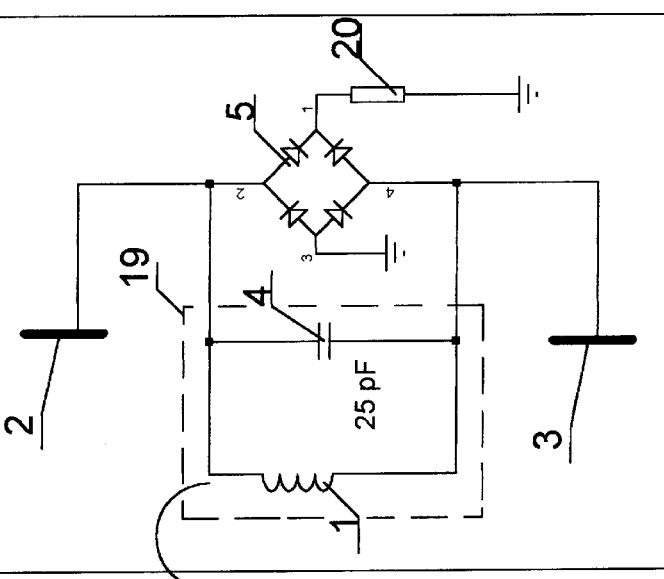
FIG. 2 is an electric block diagram showing a noncontact IC card operation in remote manner wherein power and data are transferring over inductive coupling.
Figure 4:
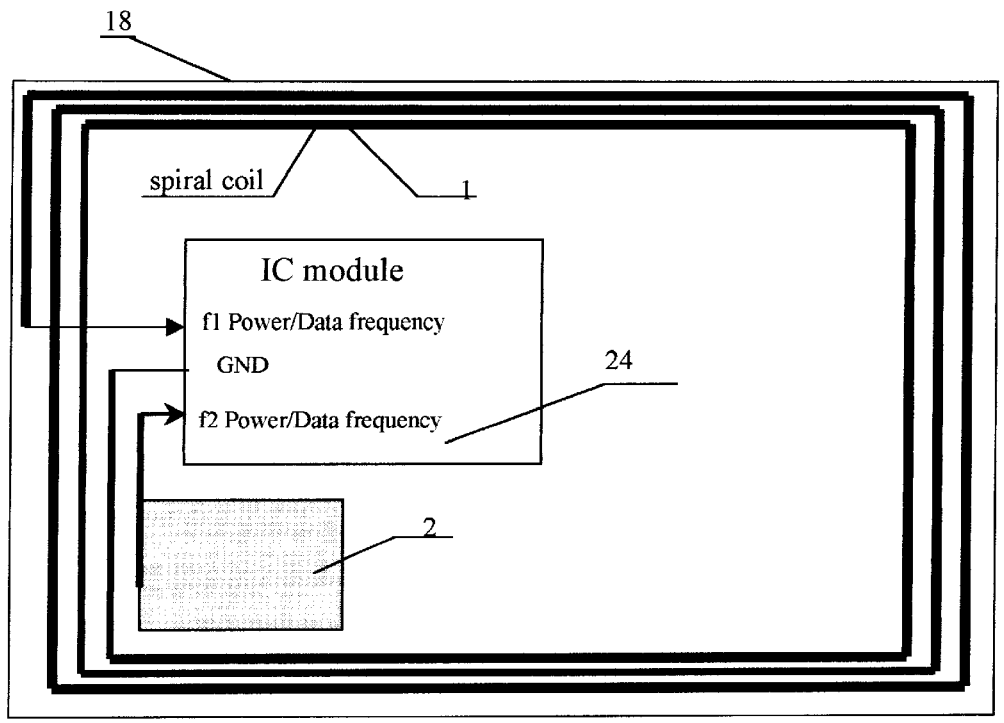
FIG. 4 is a perspective view of a first embodiment of a noncontact IC card operating in two modes: inductive and capacitive.
Figure 5:
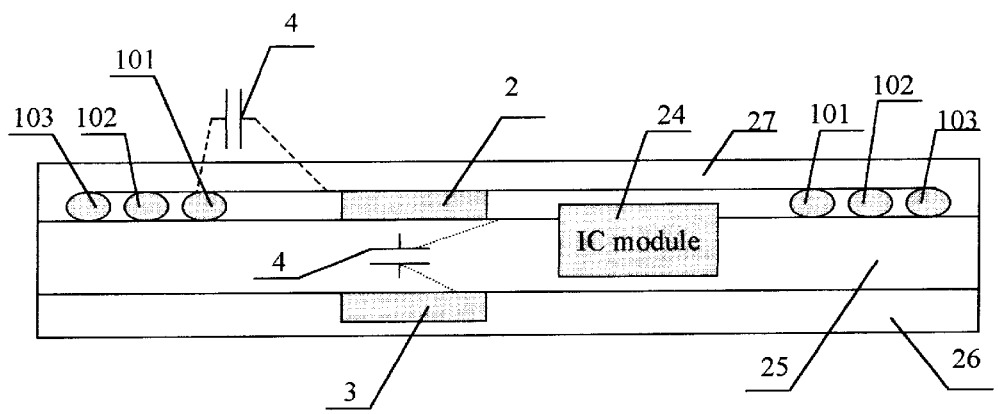
FIG. 5 is a cross section of a noncontact card according to the first embodiment.

FIG. 2 represents a noncontact IC card operation in remote manner using a distance inductive coupling, and FIG. 2 contains host terminal 16 having a transmitting-receiving antenna 17 and noncontact IC card 18, comprising receiving resonance antenna 19 combined by inductive coil 1 and distributed capacitance 4, which is a resulting parasitic capacitance of two capacitive pads 2 and 3. A first embodiment of an noncontact IC card 18, shown at FIG. 4 and FIG. 5, represent a mechanical arrangement of the spiral coil 1, capacitive pads 2 and 3 and IC module 24 on the card plane. The shape of these capacitive pads may have random form, like round, square, and etc., according to the particular application to be used.

Receiving resonance antenna 19 is loaded by diode bridge 5 and resistor 20 which represents an equivalent load of complete electronic circuit of FIG. 1, and therefore resistor 20 is shown as single part in order not to complicate the drawings.

Figure 3:
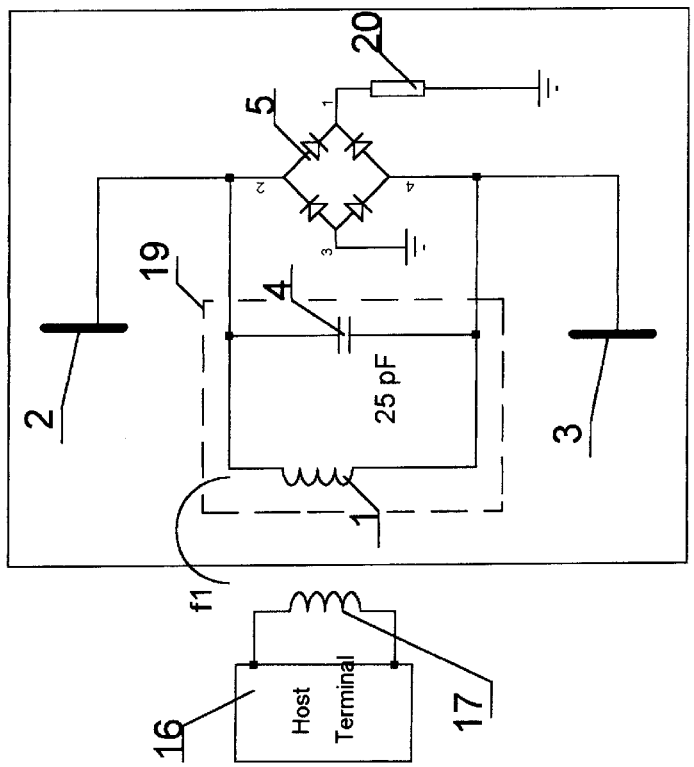
FIG. 3 is an electric block diagram depicting a noncontact IC card operation when card is inserted into the terminal and power and data transfer are provided over capacitive coupling.

FIG. 3 shows noncontact IC card operation when card is inserted into the terminal and when power and data transfer is pumped over capacitive coupling. Herein a host terminal 16 comprises an inductor 21 and a pair of capacitive pads 22 and 23. Inductor 21 is connected in series with capacitive pad 22, and afterward, when card 18 is attached to terminal 16, capacitive pads combine two capacitors. In fact, first capacitor 28 is combined by connection of pad 22 with pad 2 and second capacitor 29 is combined by connection of pad 23 and pad 3. The effective capacitance of each is provided as 220pF for one of embodiments.

Figure 6:
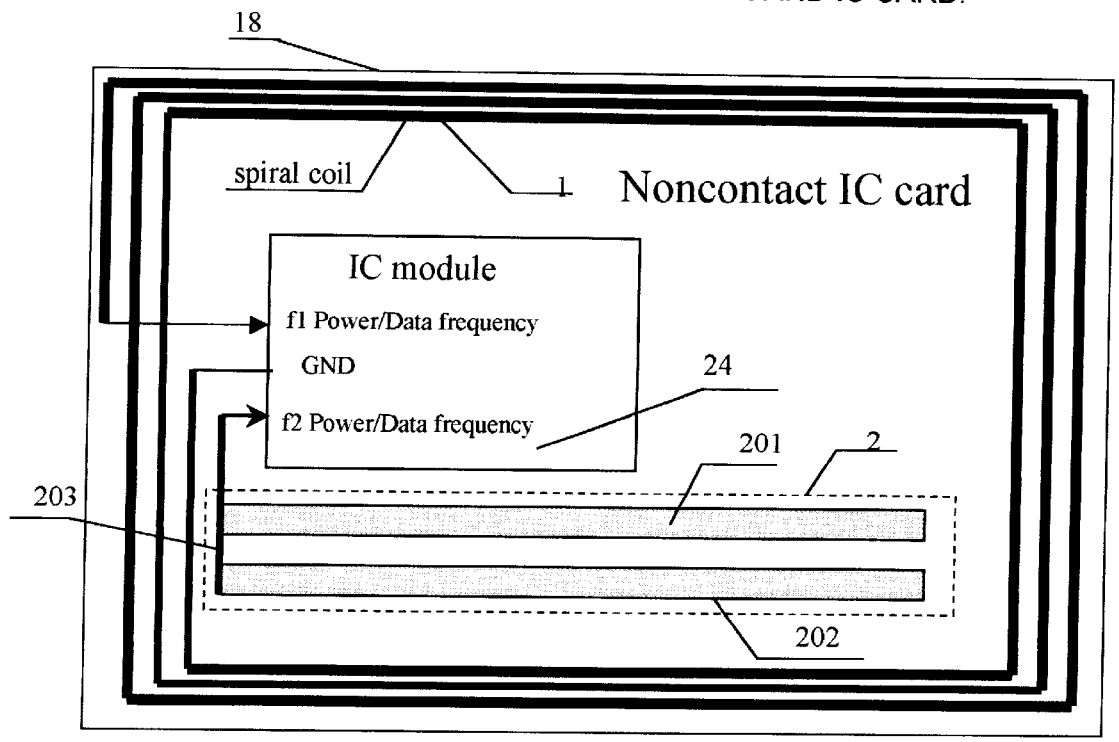
FIG. 6 is a perspective view of a second embodiment of a noncontact IC card operating in two modes: inductive and capacitive.
Figure 7:
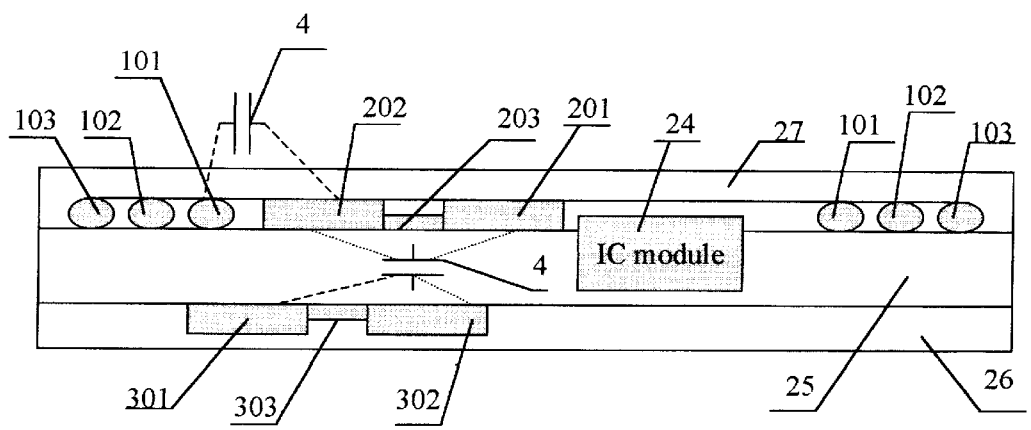
FIG. 7 is a cross section of a noncontact card according to the second embodiment.

FIG. 6 and FIG. 7 illustrate the second embodiment of the noncontact IC card 18. Herein each of capacitive pads 2 and 3 is built as two (or more) parallel conductive strips, respectively numbered as 201 and 202 at the first side and as 301 and 302 at the opposite side of the card.

FIG. 6, illustrating a perspective view of the noncontact IC card 18, shows an inductive coil 1 fashioned like a spiral coil, an integrated circuit (IC) module 24, the capacitive pad 2 comprising two parallel conductive strips 201 and 202 jointed with conductive junction 203.

A cross section of a noncontact card 18 at a FIG. 5 and FIG. 7 presents a several layer card construction wherein the IC module 24 is fitted into the central layer 25 of the card 18. The capacitive pad 2, comprising two parallel conductive strips 201 and 202 jointed with conductive junction 203, is arranged at a first card side and the capacitive pad 3, comprising two parallel conductive strips 301 and 302 jointed with conductive junction 203, is arranged at a second card side. A spiral coil includes turns 101, 102 and 103 respectively. All assembly is covered at both sides with protective nonconductive plates 26 and 27. A distributed capacitance 4 is combined as parasitic capacitance between strips 201 and 202 and strips 301 and 302 and the nearest turns of a spiral coil 1.

A card 18 is intended to operate in two modes: remote and proximate to host terminal. Since in remote mode the amount of radiated and transferred energy is restricted by Federal Regulations, therefor in this mode, at a large distances between card and terminal, the card is designed to work generally using the E²PROM 15 for data interchange. Notwithstanding, in remote mode operation the activation of MPU 14 is occurring at near distances while the amount of transferred power is adequate to provide a correct operation of MPU 14. In proximate mode, when IC card 18 is mechanically attached to a host terminal 16, it is possible to provide a significant electrical energy transfer to the card, and MPU 14 is functioning during the interaction.

Referring to a FIG. 2, in remote mode, when a noncontact IC card 18 operates in applications wherein a particular far distance is required between card and host terminal, the host terminal 16 generates an energy transmitting alternating field at a first, low, frequency which corresponds to the resonant frequency of a parallel alignment of inductive coil 1 and a distributed capacitance 4. The induced electric energy is rectified by diode bridge 5 and stabilized by voltage regulator 6. The filtering capacitor 7 smoothes voltage ripples, and therewith the stabilized voltage is used to power the electronics of IC card 18.

Clock conditioner 9 derives clock signal from an energy-transmitting alternated field, and afterward clock signal is used to synchronize the operation of MPU 14 and/or E²PROM 15. Data detector 8 demodulates a received alternating wave signal to detect the data signal. Modulating transistor 10 together with loading resistor 11 provides Data Out transmission towards the host terminal 16. Particularly, the modulating transistor 10 contributes a secondary amplitude modulation (similar to eddy currents) of energy transmitting alternating field radiated by host terminal 16. It works as following. When signal Data Out affects on transistor 10, the latest turns ON and resistor 11 makes an additional load for a resonance circuit combined by inductive coil 1 and capacitance 4, that is following with reducing of a quality factor of a resonance circuit and damping of antenna 19. This event caused to deviations in current flowing through host terminal antenna 17, which deviations are subsequently demodulated by host terminal 19; these modulation-demodulation means of host terminal are well known in the art and thus they are not shown in the figures for sake of explanation.

In proximity mode the noncontact IC card 18 is attached to a host terminal and, in particular, a card may be inserted into a slot like traditional magnetic stripe card. Herein the capacitive pads 2 and 3 combine with a pair of capacitive pads 22 and 23, which are arranged at terminal side, the two usual capacitors 28 and 29. The value of inductor 21, connected in series alignment with capacitors 28 and 29, is designed to provide a series resonance circuit at second, higher than first, operating frequency. The power rectification and stabilization is provided in proximity mode with the same diode bridge 5 and voltage regulator 6.

The main criteria to determine the values of first and second frequencies is that the span difference between values of a first and a second frequencies must be adequate to provide two independent resonance conditions without any interference. Accordingly, the first frequency is equal to a frequency of a parallel resonant circuit combined by coil 1 and distributed capacitance 4, and the second frequency is equal to a frequency of a series resonant circuit combined by inductor 21 and capacitors 28 and 29. Correspondingly, the inductance of coil 1 must be large enough to perform high impedance inductor at a second, higher, frequency. Furthermore, the distributed capacitance 4 performing parasitic capacitance (about 25 pF), serves for positive purpose even at a second, higher, frequency: this capacitor 4 provides locked circuit for flowing electric current at a moment that IC module 24 is in standby mode and does not consume and conduct any current. This stand by mode is equivalent to disconnection of a series resonant circuit: inductor 21, capacitor 28, one diode of bridge 5, resistor 20 (unlocked in stand-by mode), and other diode of bridge 5, capacitor 29. In this case a part of alternating electric current continuously flowing via capacitor 4 is corresponding to permanent conductivity between pads 2 and 3, therefore the temporary disconnection of a current path in series resonant circuit does not affect on the stability of circuit operation.

Current detector 12 serves to measure the magnitude of a flowing current to define which components of IC module must be connected to operate at a specific moment of the time. For example, in remote mode while amount of transferred energy is limited by restrictions rules, like FCC part 15, the current detector 12 measures the amplitude of transferred electric power as small value. Accordingly, the control signal outputted from detector 12 produces a command for power switch 13 to provide active signal chip select CS1 to E²PROM 15 and inactive signal chip select CS2 to MPU 14. At this moment MCU 14 having significantly large consumption turns to a disable state and does operate and does not overload the parallel resonant antenna circuit 19.

In a proximate mode when detector 12 recognizes a significantly large amount of transferred electric power, the control signal outputted from detector 12 caused the power switch 13 to provide signal chip select CS2 active to MPU 14 as well as chip select CS2 E²PROM 15. At this time both MPU 14 and E²PROM 15 are in enable state and the data may be transferred between host terminal 16 and MPU 14 and E²PROM 15 randomly according to the application program.

Additionally, current switch 13 generates a control signal to clock conditioner 9 to maintain a dividing ratio of input frequency in order to provide a constant clock rate. That is necessary because a carrier frequency of an energy-transmitting alternated field is equal to two different values, and the usage of a carrier frequency of energy-transmitting alternating field directly, as a clock, means that there will be two different clock frequencies in the system, that may affect negatively on processing procedures of MPU 14 and E²PROM 15. The control signal, outputted from detector 12, in dependence of the measured amplitude of transferred electric energy, initiates a power switch 13, whose control signal, outputted from third output, sets a dividing ratio of clock conditioner 9 to predicted factor, thus providing the constant clock pulse frequency.

Consequently, the present invention can provide a reliable, stable and unfailing operation of smart IC card in contactless manner in inserted mode when significantly large electric energy may be transferred to power on-card smart electronics, and in remote mode at a distance, while a short time transactions are necessary. Thus the card may be used in applications wherein the usage of powerful microprocessor is necessary and the storage of huge amounts of information must be provided keeping the high level security protection, and the same contactless card may be used in electronic money transfer applications, for example for access and mass transit. The utilizing of one noncontact IC card in many different applications presents to a card possessor a very convenience data carrier and electronic purse.

What is claimed is:

1. A method for contactless energy transmission and data exchange between a host terminal and integrated circuit IC card, which is powered via an energy-transmitting alternating field at a different frequencies which are modulated with data signal to provide bidirectional data transfer, comprising the steps of:

the remote bidirectional data transmission and energy transfer into the IC card at first, lowest frequency, utilizing the inductive coupling between a terminal transmitting-receiving coil and an IC card transmitting-receiving coil while IC card is separated from terminal, the close coupling bidirectional data transmission and energy transfer into the IC card at second frequency, higher than first frequency, utilizing the galvanically contactless capacitive coupling between terminal capacitive pads and IC card capacitive pads while IC card is attached closely to the terminal, wherein first frequency is designed to be a frequency of a parallel resonant circuit combined by parallel alignment of an IC card inductive coil and a distributed capacitance of IC card capacitive pads, wherein second frequency is designed to be a frequency of a series resonant circuit associated with additional inductor of terminal and joint capacitance of a terminal capacitive pads with the IC card capacitive pads, when card is attached closely to terminal, and the second frequency is selected to be as higher than first frequency where an equivalent impedance of IC card inductive coil is significantly large to load the series resonant circuit combined by serial alignment of joint capacitance created by mating of terminal capacitive pads with IC card capacitive pads with an additional inductance of terminal when IC card is attached closely to terminal.

2. A method for contactless energy transmission and data exchange of claim 1, comprising:

step of selecting clock signal from carrier frequency of energy-transmitting alternating field and step of generating enable and disable signals for elements of IC card in order to provide correct card operation while power induced into the card changes, wherein clock rate is normalized to have a constant value to provide stable operation and timing of microprocessor and memory arranged at IC card, wherein the procedure of normalization and stabilization of clock rate is controlled by means of changing the dividing ratio factor of carrier frequency of energy-transmitting alternating field, wherein procedure of changing of said dividing ratio is based upon result of measuring of current amount induced into IC card, and the procedure of generating enable and disable signals for elements of IC card is based upon result of measuring of current amount induced into IC card.

3. A system for contactless energy transmission and data exchange between a host terminal and IC card, which is powered via an energy-transmitting alternating field at a different frequencies which are modulated with data signal, wherein IC card containing first capacitive pads, diode bridge, voltage regulator with smoothing capacitor, data detector, clock conditioner and modulating means, microprocessor unit having internal memory, and additional nonvolatile memory, additionally comprising:

inductive coil for remote power receiving into the IC card at first, lowest frequency of energy-transmitting alternating field, current detector and power switch that are designed to measure current induced into the IC card and further to generate control signal to enable/disable microprocessor unit and nonvolatile memory, wherein first capacitive pads combine a distributed self-capacitance, and the inductive coil of IC card combines parallel resonance circuit with distributed self-capacitance of first capacitive pads at first frequency.

4. A system for contactless energy transmission and data exchange of claim 3 containing the host terminal comprising second capacitive pads designed to combine associated joint capacitors with corresponding first capacitive pads of IC card when last is attached to terminal, an additional inductor connected in series alignment with one of second capacitive pads of terminal, and comprising:

antenna for power radiation and data transmission and receiving, which is operating at first frequency, and said additional inductor combines a series resonance circuit with associated joint capacitors, when card is attached closely to terminal.

5. A system for contactless energy transmission and data exchange between a host terminal and IC card, which is powered via an energy-transmitting alternating field at a different frequencies which are modulated with data signal, which system containing:

the IC card comprising first capacitive pads, diode bridge, voltage regulator with smoothing capacitor, data detector, clock conditioner and modulating means, microprocessor unit having internal memory, and wherein IC card additionally comprising inductive coil, the host terminal comprising second capacitive pads designed to combine associated joint capacitors with corresponding first capacitive pads of IC card when last is attached closely to terminal, additional inductor connected in series alignment with one of second capacitive pads of terminal, and additionally host terminal comprising:

antenna for power radiation and data transmission and receiving at first, lowest frequency of energy-transmitting alternating field, wherein the inductor of host terminal combines a series resonant circuit with associated joint capacitors fabricated by mating of second capacitive pads with corresponding first capacitive pads when IC card is attached closely to host terminal, wherein first capacitive pads of IC card combine a distributed self-capacitance, wherein the inductive coil of IC card combines a parallel resonant circuit with distributed self-capacitance of first capacitive pads of the IC card when card is separated from host terminal, and wherein a frequency of series resonant circuit differs from frequency of parallel resonant circuit.

6. A system for contactless energy transmission and data exchange according claim 5, wherein a remote bidirectional data transmission and energy transfer by means of energy-transmitting alternating field from the host terminal to the IC card is provided at a first frequency which is designed to be equal to the frequency of a parallel resonant circuit combined by parallel alignment of the inductive coil and distributed self-capacitance when card is separated from host terminal, a close coupling bidirectional data transmission and energy transfer by means of energy-transmitting alternating field from the host terminal to the IC card is provided at a second frequency equal to the frequency of a series resonant circuit combined by series alignment of the terminal inductor and associated joint capacitors, when IC card is attached closely to terminal, and a second frequency is selected to be as higher than first frequency where an equivalent impedance of a said IC card inductive coil is significantly large to load the series resonant circuit combined by serial alignment of additional inductor of the terminal with associated joint capacitors fabricated by mating of second capacitive pads with corresponding first capacitive pads of IC card when card is attached closely to terminal.

7. A system for contactless energy transmission and data exchange of claim 5, comprising IC card containing:

current detector, designed to measure the amount of electric current transferred into the IC card, and wherein the current detector is coupled with voltage regulator's output in order to measure the magnitude of flowing current, wherein output of current detector is connected with power switch, which is coupled correspondingly by first output to nonvolatile memory, by second output with microprocessor, and by third output with control input of clock conditioner, which is designated to select clock signal from carrier frequency of energy-transmitting alternating field and to control the dividing ratio factor of input frequency in order to provide a constant clock rate for stable operation and timing of microprocessor and nonvolatile memory arranged at IC card, wherein the setup of dividing ratio factor of input frequency is provided according to the output signal of power switch, which signal is based upon result of measuring of induced current magnitude value flowing into IC card, and the outputted signal of power switch generates enable/disable signals for microprocessor and nonvolatile memory to provide the proper power distribution in IC card while power amount induced into the card changes.

* * * * *